US006819376B1

(12) United States Patent
Muramatsu (10) Patent No.: US 6,819,376 B1
(45) Date of Patent: Nov. 16, 2004

(54) LIQUID CRYSTAL DISPLAY DEVICE WITH A LIGHT-SHIELDING PORTION

(75) Inventor: Eiji Muramatsu, Nagano (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/051,450

(22) PCT Filed: Jul. 23, 1997

(86) PCT No.: PCT/JP97/02543

§ 371 (c)(1),
(2), (4) Date: Apr. 6, 1998

(87) PCT Pub. No.: WO98/05999

PCT Pub. Date: Feb. 12, 1998

(30) Foreign Application Priority Data

Aug. 6, 1996 (JP) .............................. 8-207402

(51) Int. Cl.$^7$ ...................... G02F 1/1333; G02F 1/1345
(52) U.S. Cl. ...................... 349/110; 349/149; 349/150; 349/152
(58) Field of Search ................................ 349/149–152, 349/110

(56) References Cited

U.S. PATENT DOCUMENTS

| 4,643,526 A | | 2/1987 | Watanabe et al. | |
|---|---|---|---|---|
| 4,826,297 A | * | 5/1989 | Kubo et al. | .................. 349/151 |
| 5,130,832 A | * | 7/1992 | Kawaguchi et al. | ........ 349/151 |
| 5,726,726 A | * | 3/1998 | Nakanishi | .................... 349/149 |
| 5,745,202 A | * | 4/1998 | Yamauchi et al. | .......... 349/110 |
| 5,748,267 A | * | 5/1998 | Natoir et al. | ................ 349/149 |

FOREIGN PATENT DOCUMENTS

| EP | 0 402 106 A2 | 12/1990 |
|---|---|---|
| EP | 0 501 413 A | 9/1992 |
| EP | 0 757 277 A1 | 2/1997 |
| JP | 2-277024 | 11/1990 |
| JP | 3-10224 | 1/1991 |
| JP | 3-74989 | 3/1991 |
| JP | 5-27726 | 4/1993 |
| JP | 5-333359 | 12/1993 |
| JP | 7-175059 | 7/1995 |

* cited by examiner

Primary Examiner—Huyen Ngo
(74) Attorney, Agent, or Firm—Harness, Dickey & Pierce, P.L.C.

(57) ABSTRACT

A liquid-crystal display device has a pair of substrates (1, 2) which are opposite to each other and a semiconductor element which is directly joined to the substrate (2). A portion other than an active surface (12a) of the surfaces of the semiconductor element (12) is covered with a light-shielding member portion (16). Since the light-shielding member (16) completely shields light irradiated from the upper and side surfaces of the semiconductor element (12) and a joint surface between the semiconductor element (12) and the substrate (1), the semiconductor element (12) can be prevented from being erroneously operated.

12 Claims, 8 Drawing Sheets

LIQUID CRYSTAL DISPLAY DEVICE WITH A LIGHT-SHIELDING PORTION

TECHNICAL FIELD

The present invention relates to a liquid-crystal display device which controls the orientation of a liquid crystal to display visible information. More specifically, the present invention relates to a liquid-crystal display device in which a semiconductor element is directly packaged on a substrate constituting a liquid-crystal panel. The present invention also relates to an electronic device on which the liquid-crystal display device is mounted.

BACKGROUND ART

Figure 8:
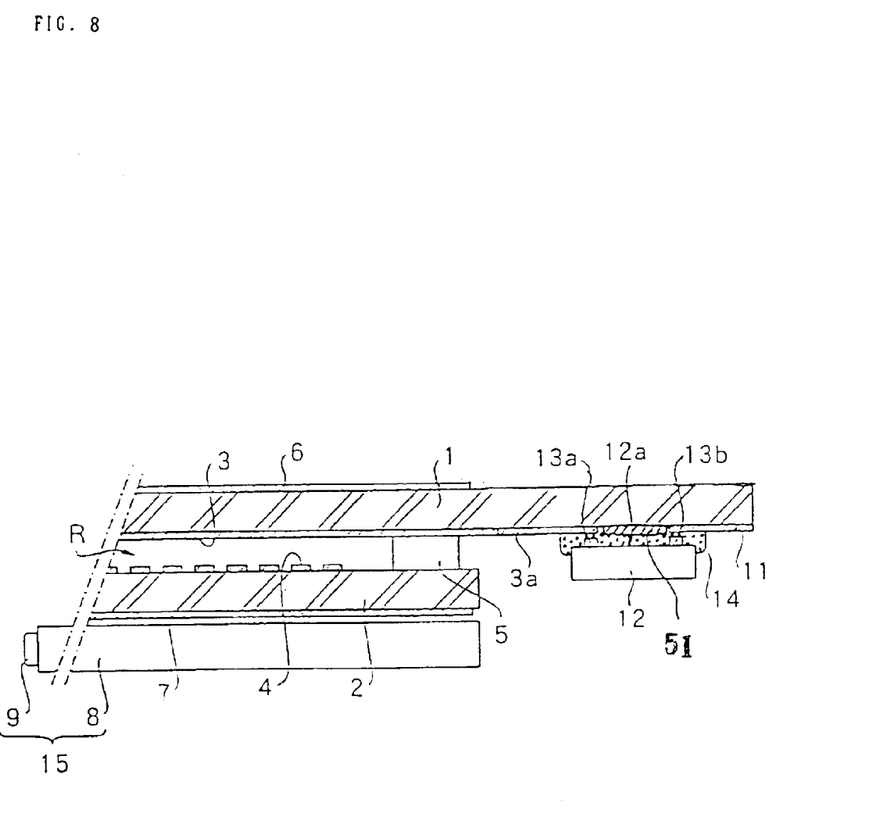
FIG. 8 is a view showing a conventional liquid-crystal display device.

In recent years, liquid-crystal display devices are popularly used in various devices such as a navigation system, a television set, a palm-top computer, an electronic organizer, and a portable telephone to display visible information. As a packaging method of packaging a semiconductor element, e.g., a driver IC, on a liquid-crystal panel in manufacturing a liquid-crystal display device, a packaging method of directly joining a semiconductor element to one of a pair of substrates which are opposite to each other through a liquid crystal, i.e., a COG (Chip On Glass) method, is known. When the COG method is used, reductions in thickness and weight of a liquid-crystal display device, micropatterning of connection pitch, and the like are expected. However, when the COG method is used, a semiconductor element is directly joined to a transparent substrate by a joining agent such as an ACF (Anisotropic Conductive Film). For this reason, light from a back light or sunlight may be directly irradiated on the semiconductor element through the substrate. The irradiated light may cause the semiconductor element to erroneously operate. The following problem is also posed. That is, light irradiated from a portion other than the active surface of a semiconductor element passes through the semiconductor element to adversely affect the active surface. As a result, the semiconductor element is erroneously operated. In order to prevent light from being irradiated on a semiconductor element packaged on a substrate by the COG method, the following conventional liquid-crystal display device is disclosed in Japanese unexamined Patent Publication No. 1-128534. FIG. 8 is a view showing a typical example of a liquid-crystal display device of this type. In a metal film forming process step for forming an active element on a substrate, a metal film 51 is also formed in a region corresponding to an IC chip, i.e., a semiconductor element, and the metal film 51 is used as a light-shielding layer for the IC chip 12.

However, in the conventional liquid-crystal display device, light irradiated from the upper or side surface of the IC chip, i.e., a surface other than the active surface of the semiconductor element, and passing through the upper surface of the semiconductor element to adversely affect the active surface of the semiconductor element, and light being incident from the connection surface between a substrate on which the semiconductor element is packaged and the semiconductor element to adversely affect the active surface of the semiconductor element are not considered. The light-shielding effect is not perfect.

In addition, in the conventional liquid-crystal display device, a light-shielding layer is consequently formed between the IC chip and the substrate. For this reason, a process for reducing a capacitance formed between the IC chip and the light-shielding layer, e.g., a process of forming the light-shielding layer as a special pattern must be performed. However, this process may be complex, and light-shielding performance may be degraded because the light-shielding layer is formed as the special pattern.

DISCLOSURE OF INVENTION

The present invention has been made in consideration of the above problems in a conventional liquid-crystal display device, and has as its object to provide a liquid-crystal display device, using the COG method, in which light can be prevented from being irradiated on a semiconductor element by only performing an extremely simple process without performing any complex process.

In order to achieve the above object, according to the present invention, a liquid-crystal display device having a pair of substrates which are opposite to each other through a liquid crystal, and a semiconductor element which is directly joined to at least one of the substrates, is characterized in that a portion of the semiconductor element other than the surface joined to one of the substrates is covered with a light-shielding member.

In this liquid-crystal display device, a light-shielding member is not formed between a semiconductor element and a substrate, and a portion, other than the surface joined to the substrate, of the surfaces of the semiconductor element joined to the substrate is covered with the second light-shielding member. More specifically, the semiconductor element itself is shielded from light by the light-shielding member. With this arrangement, the light-shielding member arranged to cover the semiconductor element completely shields light irradiated from the upper and side surfaces of the semiconductor element and the joint surface between the semiconductor element and the substrate, so that the semiconductor element can be completely prevented from being erroneously operated.

One pair of substrates which sandwich the liquid crystal consist of transparent glass therebetween. However, if there is no inconvenience on manufacture, the substrates may consist of another material such as a transparent synthetic resin. As the semiconductor element, for example, a driver IC for controlling a scanning electrode for a simple matrix, a data electrode or a driver IC for controlling a scanning line for an active matrix and a data line, and the like can be considered. Although a method of joining the semiconductor element to the substrate is not limited to a specific method, for example, the semiconductor element can be joined to the substrate by using an ACF.

The second light-shielding member for shielding light being toward the semiconductor element may be arranged on a surface opposite to the surface, to which the semiconductor element is joined, of the surfaces of one of the substrates. Although the second light-shielding member shields light irradiated from the active surface of the semiconductor element like a conventional light-shielding layer, after the semiconductor element is joined to the substrate, a light-shielding member is fixed to the opposite surface of the substrate. For this reason, the light-shielding member can be arranged by only performing an extremely simple process without performing any complex process. In addition, since the problem of a change in capacitance obtained by arranging the light-shielding member need not be considered, the light-shielding member can be formed as an arbitrary pattern. Therefore, light can be reliably prevented from being irradiated on the semiconductor element with sufficient light-shielding performance.

The present invention can be also be applied to a liquid-crystal display device using an active matrix method, or to a liquid-crystal display device using a simple matrix method. The active matrix method is a liquid-crystal display device using a format in which respective pixels arranged in the form of a matrix have active elements as in a TFT (Thin Film Transistor) method, a TFD (Thin Film Diode) method, or the like. On the other hand, the simple matrix method is a liquid-crystal display device using a formation in which a plurality of pixels having no active elements are arranged in the form of a matrix between a pair of substrates which sandwich a liquid crystal material therebetween, and includes a liquid-crystal display device which has a sign pattern in response to a function request. The prior art disclosed in Japanese Unexamined Patent Publication No. 1-128534 is on the assumption that the active matrix method is used, and a liquid-crystal display device using the simple matrix method is not considered. If the prior art is to be applied to the liquid-crystal display device using the simple matrix method, a cumbersome thin-film forming process step is assigned to form a metal light-shielding film in a region corresponding to an IC chip, and cost uneconomically increases.

Therefore, when the present invention is applied to a liquid-crystal display device using the simple matrix method, a remarkable effect can be obtained. In the liquid-crystal display device using a so-called active matrix method, a light-shielding layer, i.e., a light-shielding member, for shielding the semiconductor element from light in the processing step of forming an active element on a glass substrate can be incidentally formed. However, since the step of forming an active element is not performed in the simple matrix method, a light-shielding layer cannot be incidentally formed.

As a method of joining a semiconductor element to a substrate, a so-called face-down method which joins the semiconductor element to the substrate such that the active surface of the semiconductor element to the substrate, and a so-called face-up method which joins the semiconductor element to the substrate such that the surface opposite to the active surface of the semiconductor element is in contact with the substrate are considered. The present invention can be applied to the face-down method of the above two methods. When the face-up method is employed, a light-shielding member is not arranged to cover the semiconductor element from the upper surface, but the semiconductor element is joined to the substrate, and a light-shielding member is fixed to a position corresponding to the semiconductor element on the opposite surface of the substrate. In this case, as in the present invention, light irradiated from a surface other than the active surface side of the semiconductor element can be shielded.

According to the present invention, various specific examples of a light-shielding member can be considered. For example, since a polarizing plate is fixed to the surface of a substrate in a general liquid-crystal display device, the size of the polarizing plate is made large to extend the polarizing plate to the outside of the effective display region of a liquid-crystal panel, i.e., a portion where the semiconductor element is packaged, and the extended portion can be used as the light-shielding member. Also, a sheet member having light-shielding properties is arranged to cover the semiconductor element, so that the light-shielding member can be constituted. The light-shielding member can also be formed such that the surface of a semiconductor element joined to a substrate is covered with a molding resin. When the semiconductor element is covered with a molding resin, the semiconductor element can be shielded from light. In addition, the semiconductor element is mechanically protected by the molding resin, or the semiconductor element can also be prevented from being exposed to humidity.

As a specific example of the second light-shielding member, the following can be used. That is, like the above light-shielding member, the size of the polarizing plate is made large to extend the polarizing plate to the outside of the effective display region of a liquid-crystal panel, i.e., a portion where the semiconductor element is packaged, and the extended portion can be used as the light-shielding member. In addition, a sheet member having light-shielding properties may be stuck on the surface, which is opposite to the semiconductor element, of the substrate.

In addition, when one light-shielding tape having light-shielding properties and flexibility is adhered to the substrate such that the tape is bent around the substrate, the two functions of the light-shielding member and the second light-shielding member can be achieved by one light-shielding tape. In this case, when a tape material having flexibility and elasticity is used as a light-shielding tape, the light-shielding tape can be attached to be in tight contact with the semiconductor element or the substrate. For this reason, the outside size of the liquid-crystal display device is not vainly increased, and operability can be improved.

According to the present invention, an electronic device in which a liquid-crystal display device having a pair of substrates which are opposite to each other through a liquid crystal and a semiconductor element which is directly joined to at least one of the substrates and a main body having a main substrate for sending an external input signal to the semiconductor element are connected to each other by a connection circuit substrate is characterized in that a portion other than a surface, which is joined to one of the substrates, of the surfaces of the semiconductor element is covered with a light-shielding member.

The electronic device is characterized in that a second light-shielding member for shielding light being toward the semiconductor element is arranged on a surface, opposite to the surface, to which the semiconductor element is joined, of the surfaces of one of the substrates to extend to an outside position of one of the substrates, and the extended portion of the second light-shielding member is arranged to overlap the connection circuit.

In an electronic device such as a portable telephone, it is required to assure the connection reliability of a connection circuit substrate for connecting a main body to a liquid-crystal display device. In the electronic device according to the present invention, the second light-shielding member is formed to extend to the outside portion of the substrate, and the extended portion is arranged to overlap the connection circuit substrate. For this reason, the strength of the connection substrate, especially, the strength of the connection portion, is improved. As a result, higher connection reliability can be obtained. In addition, since the second light-shielding member is used as a reinforcing member for the connection substrate, the number of new parts for reinforcing the connection substrate does not increase, and manufacturing steps for the new parts are not required. For this reason, production cost is not adversely affected.

As a specific example of the second light-shielding member, the light-shielding member used in the above liquid-crystal display device, i.e., a sheet member comprising a polarizing plate and light-shielding properties can be directly used.

When a flexible substrate such as an FPC is used as the connection circuit substrate, the reinforcing effect becomes more remarkable.

As an example of the electronic device according to the present invention, in addition to a portable telephone, a PDA (Personal Digital Assistant), a personal computer, a car navigation system, and the like are known.

BEST MODE FOR CARRYING OUT THE INVENTION

First Embodiment

Figure 1:
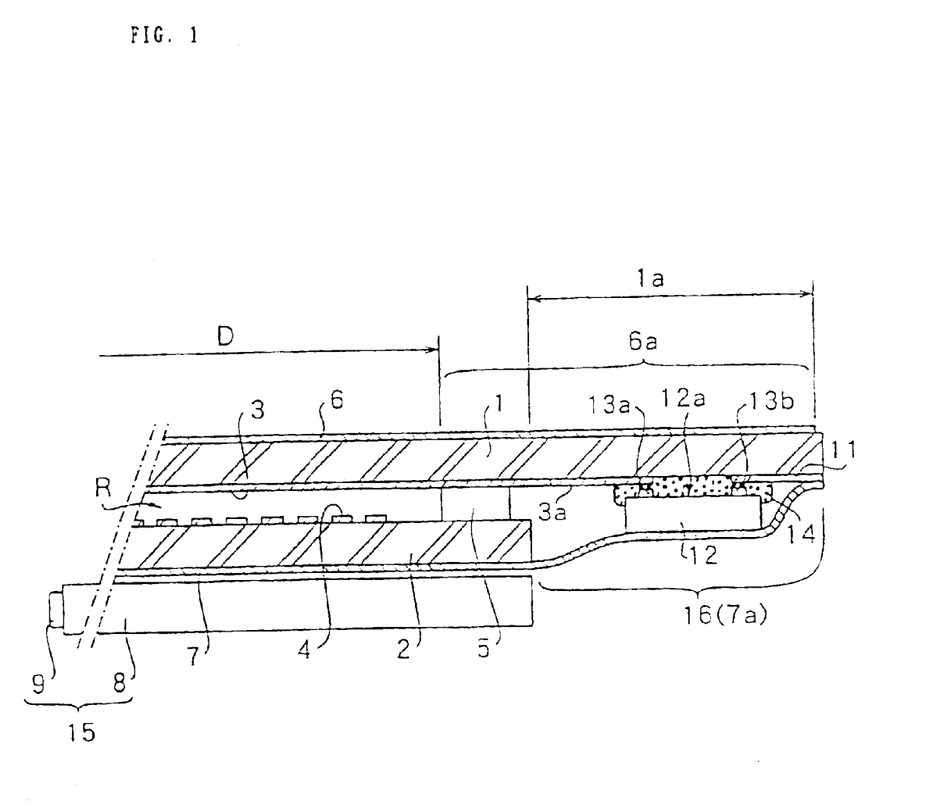
FIG. 1 is a sectional view showing a main part of the first embodiment of a liquid-crystal display device according to the present invention.
Figure 5:
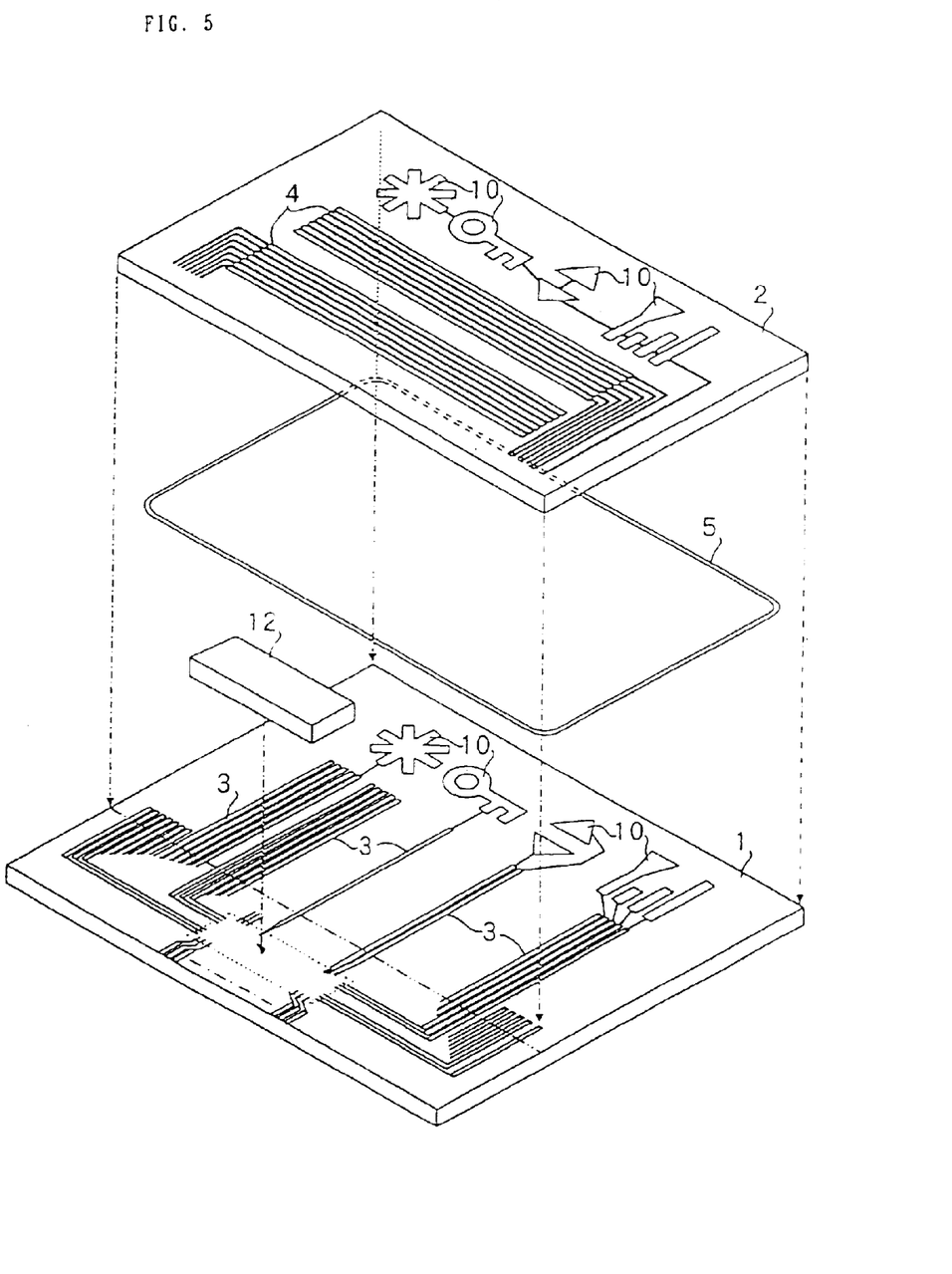
FIG. 5 is a perspective view showing an example of the liquid-crystal panel portion of the liquid-crystal display device according to the present invention.

FIG. 1 shows the first embodiment of a liquid-crystal display device according to the present invention. This liquid-crystal display device has a pair of substrates 1 and 2 which are opposite to each other. Both the substrates consist of, e.g., transparent glass. A stripe-shaped ITO (Indium Tin Oxide) electrode 3 is formed on the inside surface (lower surface in FIG. 1) of the first substrate 1, and a stripe-like ITO electrode 4 is formed on the inside surface (upper surface in FIG. 1) of the second substrate 2. In this embodiment, the present invention is to be applied to a liquid-crystal display device using a simple matrix method. Therefore, the first substrate 1 and the second substrate 2 are joined to each other by a sealing agent 5 such that the ITO electrodes 3 and 4 are perpendicular to each other as shown in FIG. 5. As well known, pixels for displaying a visible image are formed at the crossing point between the electrodes 3 and 4 in the form of a matrix. Referring to FIG. 1, a liquid crystal is filled in a space R surrounded by the first substrate 1, the second substrate 2, and the sealing agent 5.

As the material of the electrode, any transparent electrode consisting of, e.g., not only an ITO but also a tin oxide ($SnO_2$), may be used. As the shape of the electrode on a display surface, not only a stripe shape, but also a special symbol (i.e., a symbol representing a function) as indicated by 10 in FIG. 5 may be used.

Polarizing plates 6 and 7 are fixed to the outside surface (upper surface in FIG. 1) of the first substrate 1 and the outside surface (lower surface in FIG. 1) of the second substrate 2, respectively. The light-transmission axes of the polarizing plates 6 and 7 are offset from each other by, e.g., 90°. A back light unit 15 is arranged on the outside (the lower side in FIG. 1) of the second substrate 2. The back light unit 15 comprises a light-guide plate 8 having an area corresponding to an effective display region D and an LED (Light Emitting Diode) 9 serving as a light source arranged on the left-end portion of the light-guide plate 8.

An end portion 1a of the first substrate 1 projects outside the second substrate 2, an IC output terminal 3a extending from the ITO electrode 3 and an IC input terminal 11 electrically connected to the output terminal of an outer circuit substrate (not shown) are formed on the inside surface of the projection portion 1a. A driver IC 12 serving as a semiconductor element is electrically and mechanically directly fixed to a surface on which bump electrodes 13a and 13b and a circuit pattern are formed, i.e., on the first substrate 1 by an ACF 14 in such a manner that the so-called active surface 12a faces the first substrate 1. Of the surfaces of the driver IC 12 joined to the first substrate 1, surfaces other than the surface joined to the first substrate 1 are covered with the light-shielding member 7a. In this embodiment, the polarizing plate 7 on the second substrate 2 side is extended to the outside region of the effective display region D, and the light-shielding member 16 is constituted by the extended portion 7a. The polarizing plate 6 arranged on the first substrate 1 fixed to the driver IC 12 extends to the projection portion 1a of the first substrate 1 over the effective display region D, and the polarizing plate extended portion 7a operates as a light-shielding member on the active surface side of the driver IC 12.

Since the liquid-crystal display device of this embodiment is arranged as described above, when voltage application to the electrodes 3 and 4 is controlled by the driver IC 12 while light is emitted from the back light unit 15, a desired visible image is displayed in the effective display region D.

While the visible image is displayed as described above, part of light emitted from the back light unit 15 tends to be irradiated on the active surface 12a of the driver IC 12 through the upper and side surfaces of the semiconductor element 12 and the joint portion between the first substrate 1 and the semiconductor element 12. Depending on cases, sunlight passes through the first substrate 1 or passes around the end portion of the first substrate 1. Thereafter, the light tends to be incident on the active surface 12a through the upper and side surfaces of the semiconductor element 12 and the joint portion between the first substrate 1 and the semiconductor element 12.

In addition, light emitted from the back light unit 15 or sunlight tends to be directly incident on the active surface 12a through the first substrate 1. It is not too preferable for the driver IC 12 that light is incident on the active surface 12a.

In this embodiment, progressing of the light which tends to be incident on the active surface of the driver IC through the upper and side surfaces of the driver IC 12 and the joint portion between the first substrate 1 and the semiconductor element 12 is blocked by the polarizing plate extended portion 7a, and the active surface 12a is shielded from light. The light-shielding member 7a for shielding the driver IC 12 from light is constituted as follows. That is, the polarizing plate 7 quite generally used in the liquid-crystal display device is increased in area, and the polarizing plate 6 is simply arranged to cover the driver IC 12. Therefore, a specially complex processing step need not be performed to arrange the light-shielding member 7a, and the liquid-crystal display device is extremely economical with respect to the number of parts or the number of manufacturing steps.

Progressing of the light which tends to be incident on the active surface 12a of the driver IC 12 through the first substrate 1 is blocked by the polarizing plate extended portion 6a, and the active surface 12a is sufficiently shielded from light in practice. As a result, the driver IC 12 can be reliably prevented from being erroneously operated by light reception. Like the above light-shielding member 7a, the second light-shielding member 6a for shielding the active surface side of the driver IC 12 is constituted as follows. That is, the polarizing plate 6 quite generally used in the liquid-crystal display device is increased in area, and the polarizing plate 6 is simply fixed to the rear surface of the first substrate 1 when viewed from the driver IC 12. Therefore, a specially complex processing step need not be performed to arrange the second light-shielding member, and the liquid-crystal display device is extremely economical with respect to the number of parts or the number of manufacturing steps. When a light-shielding layer is formed between the driver IC 12 and the first substrate 1 as in the prior art, the light-shielding layer must be formed as a proper pattern in consideration of the problems of electric capacitance or electric insulation. However, the polarizing plate-extended portion 6a operating as the light-shielding member in this embodiment can be formed as an arbitrary pattern which can exercise sufficient light-shielding performance. Therefore, the driver IC 12 can be reliably shielded from light.

Second Embodiment

Figure 2:
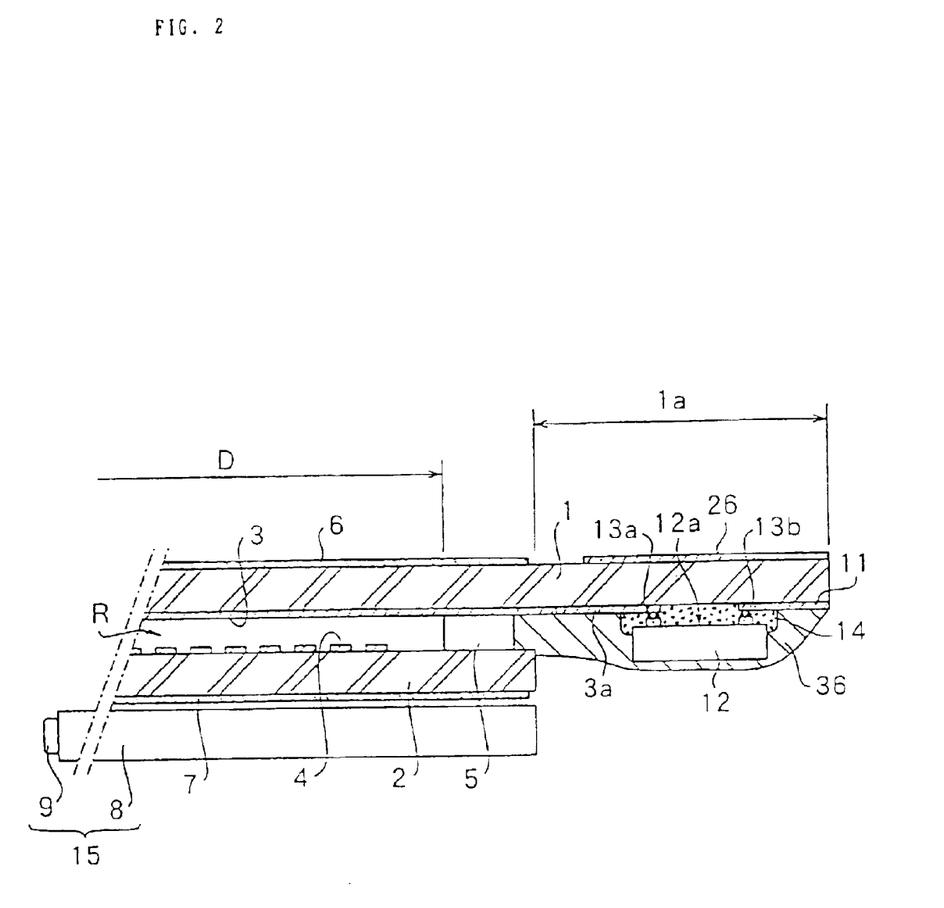
FIG. 2 is a sectional view showing a main part of the second embodiment of a liquid-crystal display device according to the present invention.

FIG. 2 shows the second embodiment of a liquid-crystal display device according to the present invention. In this liquid-crystal display device, a light-shielding sheet member 26 operating as a second light-shielding member is adhered to a surface, which is opposite to a driver IC 12, of a first substrate 1 to which a driver IC 12 is joined. In addition, when the surface of the driver IC 12 other than an active surface 12a is covered with a resin mold 36, the resin mold 36 is used as the light-shielding member.

The second light-shielding sheet member 26 can be constituted by a flexible adhesive tape having black or another non-transparent color, a non-flexible adhesive sheet having black or another non-transparent color, or the like. In addition, the resin mold 36 can consist of an arbitrary resin material, having light-shielding properties, such as a thermoplastic resin or a thermosetting resin.

Third Embodiment

Figure 3:
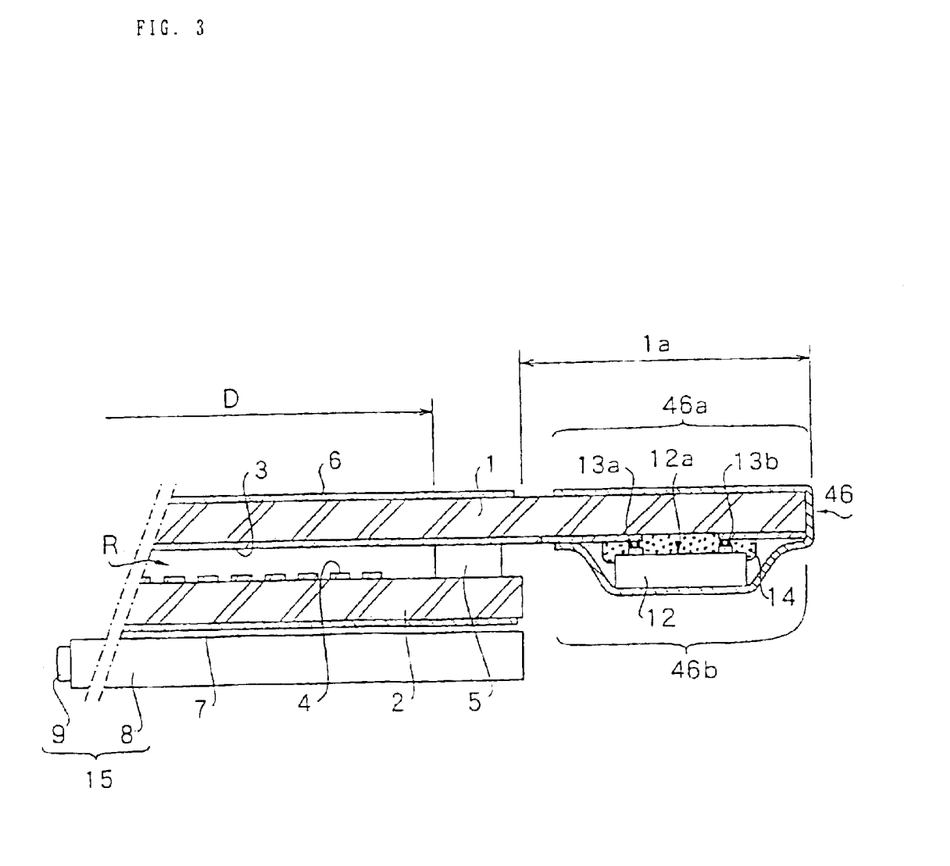
FIG. 3 is a sectional view showing a main part of the third embodiment of a liquid-crystal display device according to the present invention.

FIG. 3 shows the third embodiment of a liquid-crystal display device according to the present invention. In this liquid-crystal display device, one adhesive tape 46 having light-shielding properties and flexibility is adhered to a first substrate 1 such that the adhesive tape 46 is bent around the first substrate 1, thereby constituting a light-shielding member 46a on the substrate side and a light-shielding member 46b on a driver IC 12 side. According to this embodiment, when the very simple operation that one adhesive tape 46 is adhered to both the front and rear surfaces of the first substrate 1 is performed, the driver IC 12 can be reliably shielded from light. When a tape material also having elasticity is used as the adhesive tape 46, the tape can be fitted on the driver IC 12 and the substrate 1 in a tight contact state.

Fourth Embodiment

Figure 4:
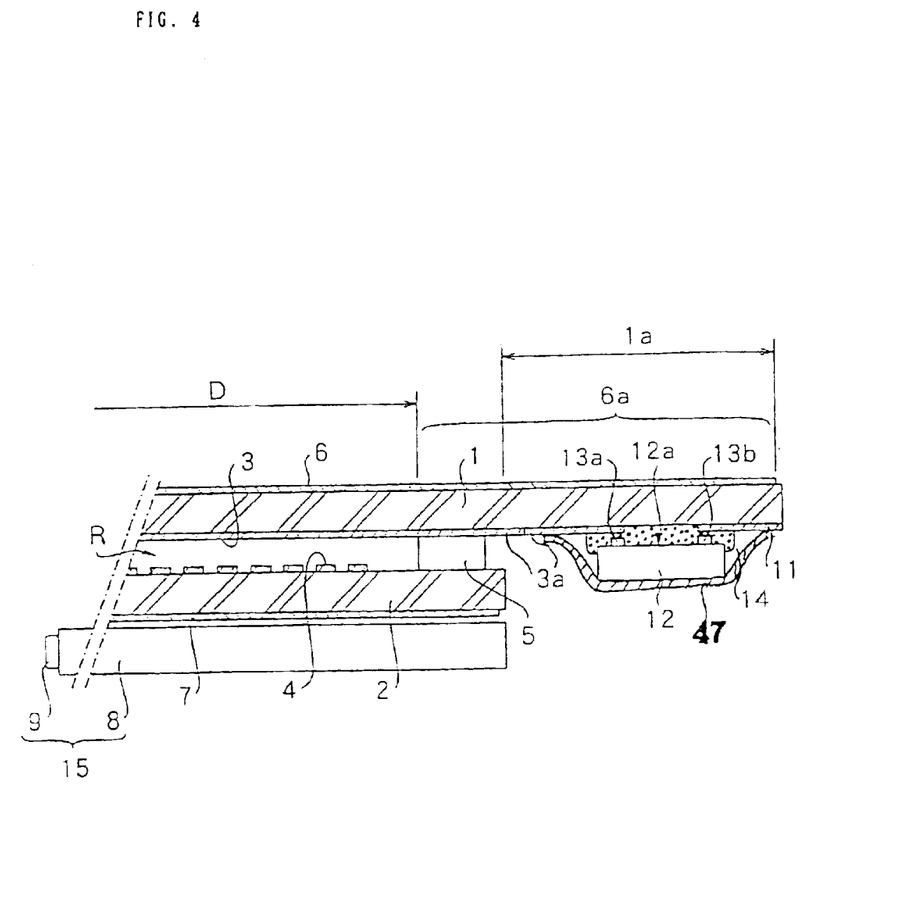
FIG. 4 is a sectional view showing a main part of the fourth embodiment of a liquid-crystal display device according to the present invention.

FIG. 4 shows the fourth embodiment of a liquid-crystal display device according to the present invention. In this liquid-crystal display device, an adhesive tape 47 having light-shielding properties is stuck on a driver IC 12 to cover the driver IC 12, thereby constituting a light-shielding member 47. In the second light-shielding member on the substrate side, as in the first embodiment, a polarizing plate quite generally used in a liquid-crystal display device is increased in area, and a polarizing plate 6 is simply fixed to the rear surface of a first substrate 1 when viewed from the driver IC 12.

Fifth Embodiment

Figure 6:
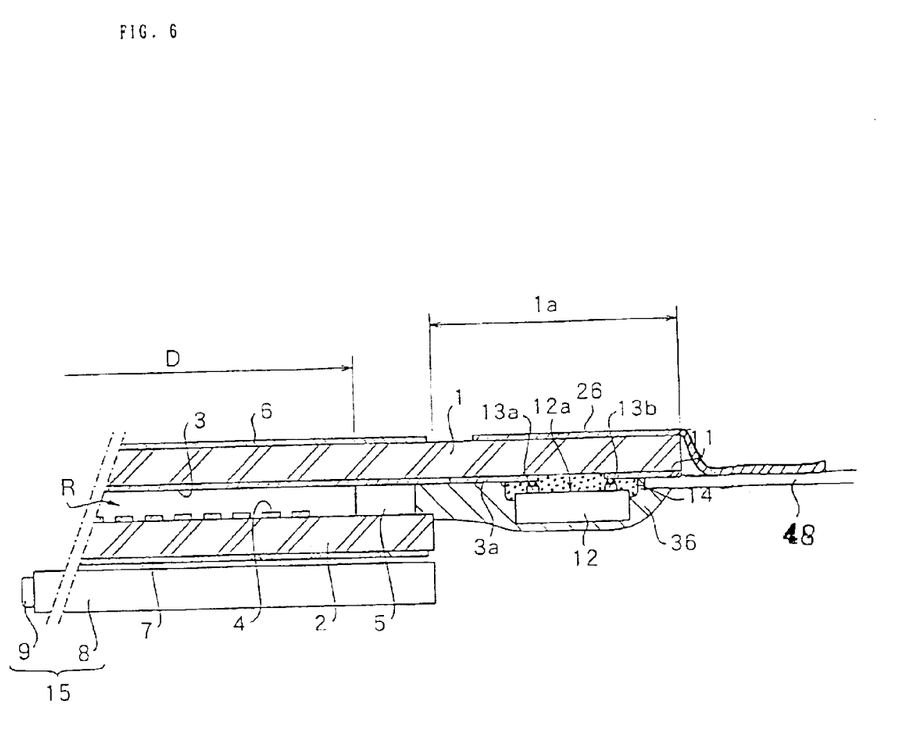
FIG. 6 is an enlarged view of a main part of the fifth embodiment of an electronic device according to the present invention.
Figure 7:
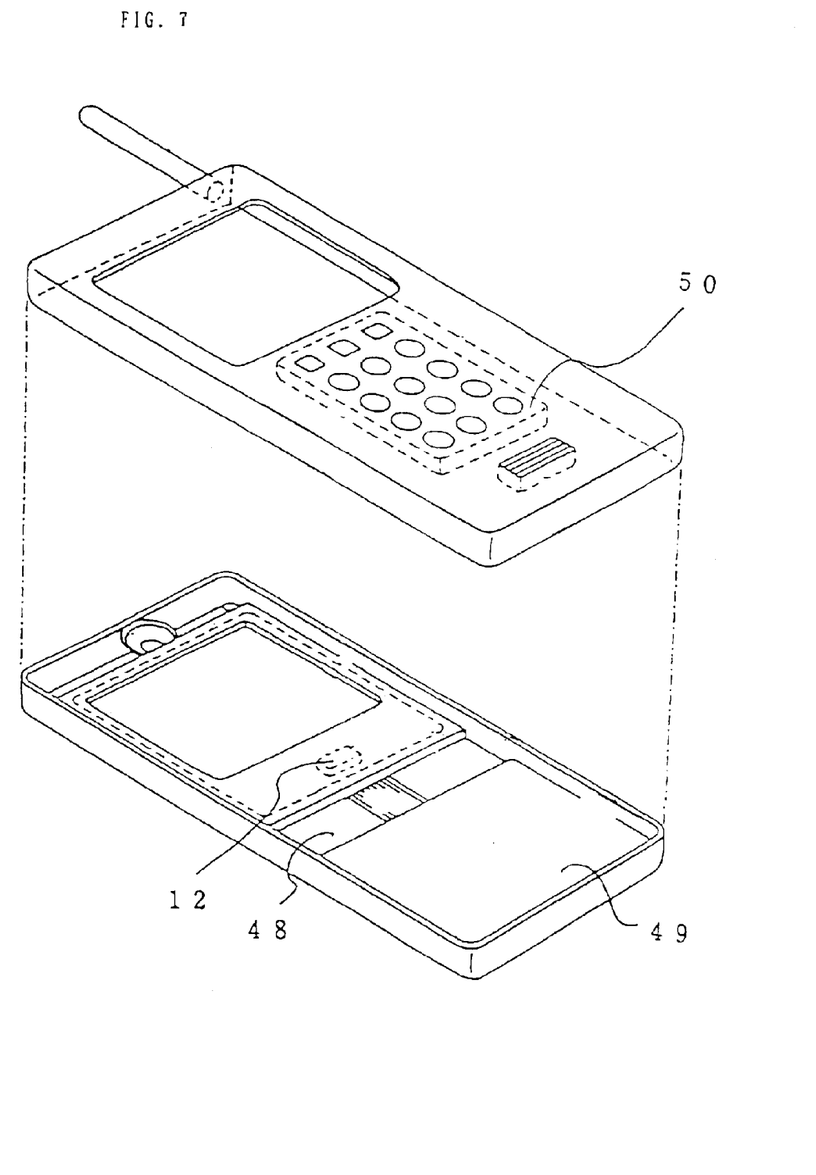
FIG. 7 is a view showing the fifth embodiment of the electronic device according to the present invention.

FIG. 6 is a view showing the details of the connection portion of an electronic device according to the present invention, and FIG. 7 is a view showing the electronic device according to the present invention. An end portion 1a of a first substrate 1 projects outside a second substrate 2, an IC output terminal 3a extending from an ITO electrode 3 and an IC input terminal 11 electrically connected to the output terminal (not shown) of a connection circuit substrate 48 are formed on the inside surface of the projection portion 1a. The input terminal (not shown) of the connection circuit substrate 48 is connected to a main substrate 49 for sending an external input signal input from an external key 50 to the driver IC 12. The driver IC 12 serving as a semiconductor element is electrically and mechanically directly fixed to the first substrate 1 by an ACF 14 in such a manner that the so-called active surface 12a faces the first substrate 1. Of the surfaces of the driver IC 12 joined to the first substrate 1, surfaces other than the surface joined to the first substrate 1 are covered with the resin mold 36 serving as a light-shielding member. The resin mold 36 can consist of an arbitrary resin material, having light-shielding properties, such as a thermoplastic resin or a thermosetting resin. A light-shielding sheet member 26 operating as a second light-shielding member is adhered to a surface, which is opposite to a driver IC 12, of a first substrate 1 to which a driver IC 12 is joined. The light-shielding sheet member 26 can be constituted by a flexible adhesive tape having black or another non-transparent color, a non-flexible adhesive sheet having black or another non-transparent color, or the like. The light-shielding sheet member 26 is arranged to stick out of the first substrate, and the sticking portion is stuck on the connection circuit substrate 48 to overlap it. In this manner, the light-shielding sheet member 26 operates to reinforce the connection between the connection circuit substrate and the first substrate.

In this embodiment, the resin mold 36 is used as a light-shielding member, and a light-shielding adhesive tape is used as the second light-shielding member. However, as the light-shielding member and the second light-shielding member, both the light-shielding member and the second light-shielding member which are described in the first to fourth embodiments can be used, as a matter of course.

Another Embodiment

The present invention has been described with reference to the preferable embodiments. However, the present invention is not limited to these embodiments, and the present invention is variously modified within the technical range described in the claims.

For example, the present invention is not limited to not only a liquid-crystal display device using a simple matrix method, but also a liquid-crystal display device using an active matrix method. A method of joining the driver IC 12 to the substrate is not limited to a method using an ACF, and an arbitrary joining method can be employed. As a back light unit, not only a unit constituted by an LED and a light-guide plate, but also another arbitrary light-emitting means such as an EL (Electro Luminescence) can be used. In each of the embodiments shown in FIGS. 1 to 4, the back light unit 15 is arranged on the substrate 2 side opposite to the substrate 1 to which the driver IC 12 is joined. In place of this arrangement, the back light unit 15 may be arranged on the substrate 1 side to which the driver IC 12 is joined.

As the fifth embodiment, a portable telephone is exemplified. However, the present invention can be applied to not only a portable telephone but also a PDA (Personal Digital Assistant), a personal computer, a car navigation system, and the like.

What is claimed is:

1. A liquid-crystal display device comprising:

a first transparent substrate;

a second substrate opposing said first substrate, said first substrate including an end portion extending beyond an edge of said second substrate;

liquid crystal positioned between said first and second substrates;

a semiconductor element mounted on an inner surface of said end portion of said first substrate spaced apart from said edge of said second substrate so as to form a gap between said edge of said second substrate and said semiconductor element;

a backlight unit positioned behind said second substrate relative to said first substrate; and a light shielding member positioned over said semiconductor element and extending in a direction toward said first substrate at least partially into said gap.

2. The liquid crystal display device according to claim 1, wherein:

said semiconductor element has an active surface and another surface opposite said active surface, said active surface facing the first substrate; and said another surface is covered with said light shielding member.

3. The liquid crystal display device according to claim 1, further comprising another light shielding member including a polarizing plate positioned on an outer surface of said second substrate.

4. The liquid crystal display device according to claim 1, further comprising a polarizing plate positioned on said an outer surface of first substrate so as to cover said semiconductor element.

5. The liquid crystal display device according to claim 1, wherein said light shielding member further comprises an adhesive tape.

6. The liquid crystal display device according to claim 1, wherein the light shielding member extends from the semiconductor element and is connected to the first substrate in the gap.

7. A liquid crystal display device comprising:

a first substrate;

a second substrate positioned opposite said first substrate, said first substrate including an end portion extending beyond an edge of said second substrate;

liquid crystal positioned between said first and second substrates;

a semiconductor element positioned on said end portion of said first substrate, said semiconductor element including an active surface facing said end portion, said semiconductor element being spaced apart from said edge of said second substrate so as to form a gap between said semiconductor element and said second substrate;

a light source positioned proximate said second substrate, the light source emitting light toward the active surface; and a light shielding member positioned over said semiconductor element and extending at least partially between the light source and the active surface to shield the active surface from light emitted from the light source toward the active surface.

8. The liquid crystal display device of claim 7 wherein said light shielding member extends into said gap.

9. The liquid crystal display device of claim 7 wherein said light shielding member extends at least partially over said gap.

10. The liquid crystal display device according to claim 7, wherein said light shielding member further comprises an adhesive tape.

11. A liquid crystal display device comprising:

a first substrate;

a second substrate opposing the first substrate, the second substrate having light transmitting properties and having first and second surfaces on opposite sides thereof, the second substrate including a projecting portion projecting beyond an edge of the first substrate;

liquid crystal positioned between the first and second substrates;

a semiconductor element having an active surface facing the first surface of the second substrate at the projecting portion; and a polarizing plate disposed on the second surface of the second substrate and extending along the projecting portion over at least the entire active surface of the semiconductor element.

12. The liquid crystal display device according to claim 11, wherein the semiconductor element is mechanically fixed to the first surface through bump electrodes, the polarizing plate extending over all of the bump electrodes.

* * * * *